Dec. 14, 1926.
F. F. BAKER
PROCESS OF DOUBLE EXPOSURE
Filed Dec. 2, 1925
1,610,410
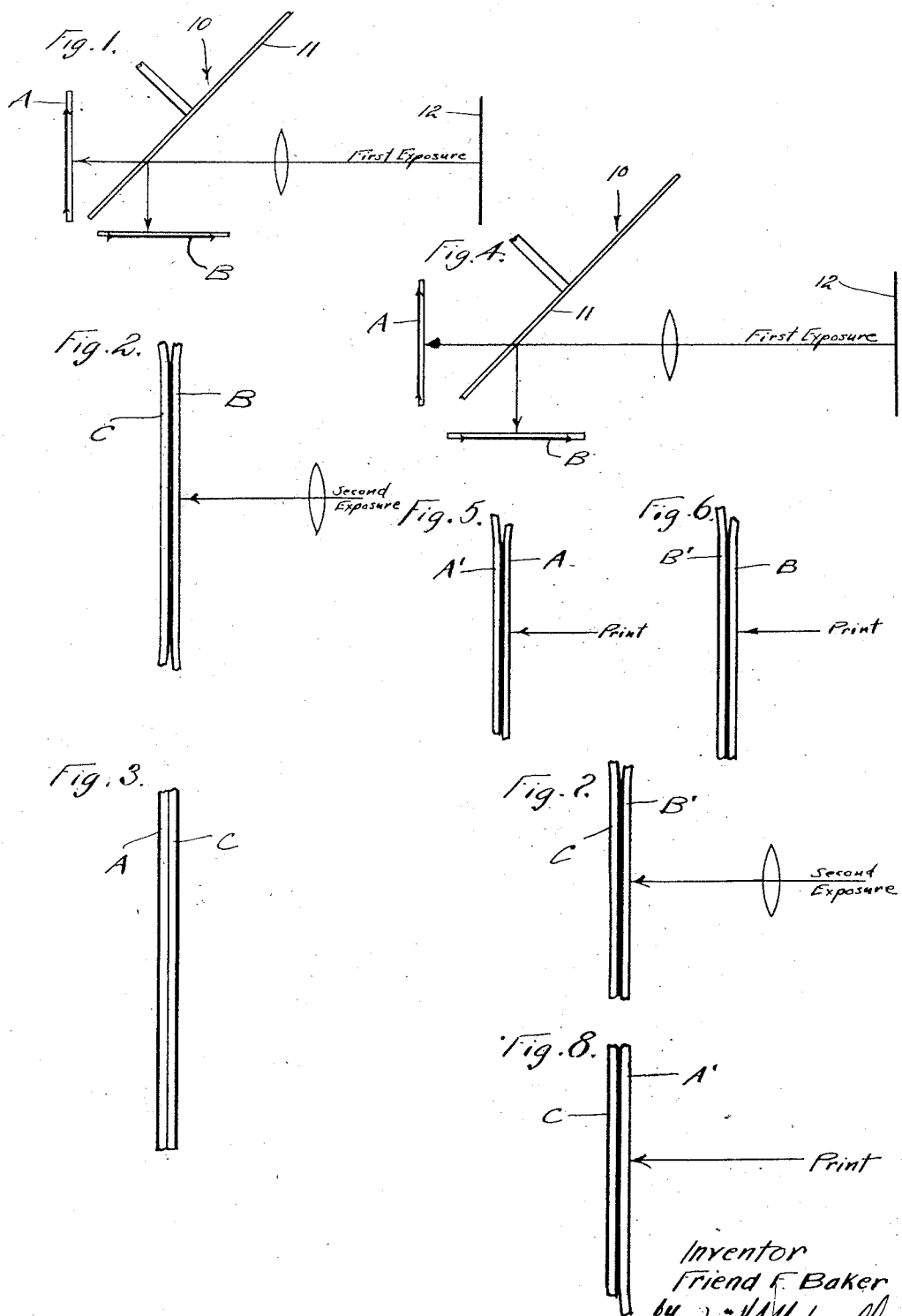

Patented Dec. 14, 1926.

1,610,410

UNITED STATES PATENT OFFICE.

FRIEND F. BAKER, OF LANKERSHIM, CALIFORNIA.

PROCESS OF DOUBLE EXPOSURE.

Application filed December 2, 1925. Serial No. 72,720.

This invention has to do with a process of double exposure and it is an object of the invention to provide a simple, effective and practical process for obtaining two registered images on a single film.

An object of this invention is to provide a process of double exposure by which double exposed motion picture film can be effectively and economically made.

Another object of this invention is to provide a process of double exposure whereby accurate registration of the two exposures on a single film is obtainable.

The objects and features of this invention will be best and more fully understood from the following detailed description of typical manners in which it may be carried out, throughout which description reference is had to the accompanying drawings, in which:

Figs. 1, 2 and 3 illustrate diagrammatically various steps in carrying out my process, Fig. 1 being a view illustrating the manner in which the first exposure is made, Fig. 2 being a view illustrating the manner in which the second exposure is made, and Fig. 3 being a view illustrating the final or completed film.

Figs. 4, 5, 6, 7 and 8 illustrate diagrammatically various steps in another manner of carrying out my invention, Fig. 4 illustrating the manner in which the first exposure is made, Figs. 5 and 6 illustrating steps whereby secondary films are made, and Figs. 7 and 8 illustrating steps whereby the final film is made from the secondary films.

This invention is particularly valuable commercially as applied to the production of motion picture film, so therefore I will proceed to describe manners of carrying out the invention particularly suited for the production of such film.

In carrying out the form of the invention illustrated by Figs. 1, 2 and 3 of the drawings, the first exposure is made onto two films A and B simultaneously so that the relation of the exposures on the two films is reversed, that is, so that one is left handed and the other right handed. To obtain the desired exposure of the two films A and B I may employ suitable light dividing means 10. Although it will be obvious that any suitable light dividing means may be used I will refer particularly to a means which includes a rotating disk 11 having a reflective surface angularly disposed with reference to the shaft of light from the subject 12 so that it directs light from the subject onto the film B, and openings which allow the light to pass directly onto the film A. In the case of motion picture apparatus this rotating reflector is operated in proper synchronism with the movement mechanism of the camera. The film A is arranged with its emulsion side away from the subject while the film B is arranged with its emulsion side forward or facing the subject. In making this first exposure the subject 12 is preferably taken against a dark or black background in order that decided contrast be obtainable in the images on the films.

After the first exposure the film B, which I will term the mat film, is developed or treated so that the exposed parts become dark or substantially opaque. The film B thus becomes a mat. The exposed parts of the mat film B may be made opaque by suitable treatment or development, or by dyeing, hand painting, or any other means.

The second exposure is made through the mat film B onto a film C which is to enter into the final negative film. By making the exposure onto the film C through the mat film B the opaque parts on the mat film corresponding to the parts exposed upon the first exposure operate to mat out on the film C so that said parts are not exposed to light from the subject of the second exposure. During the second exposure the mat film B is arranged with its emulsion side against the film C so that the matted out parts on the film C are correspondingly related to the exposed parts on film A. The film C is arranged so that its emulsion side faces the film B, so that the films have their emulsion sides together.

The film A exposed during the first exposure, and the film C exposed during the second exposure through the mat film B, are then cemented or otherwise secured together in registering relation and are developed. Films A and C are cemented together with their emulsion sides out so that the final negative film, formed or composed of the joined film A and C, carries the image of the first exposure on one side and the image of the second exposure on the other side, the images being in register. Positive prints can be made from the final negative thus produced in an optical printer or other suitable apparatus. It is to be particularly noted that the films A and C which enter into the final negative are both subjected to the same treatment, that is as to the same development, and that the development is preferably made after the films are cemented together thus eliminating inaccuracies in register of the images on the two films due to differences in shrinkage between the films A and C. In practice the celluloid bodies of the films A and C are thin so that the final negative formed by them is not too thick. Any slight inaccuracy of register that might be caused by the development of the film B may be neutralized or compensated for by subjecting the film A to a suitable amount of moisture before it is united with the film C.

In the manner of carrying out my invention illustrated in Figs. 4 to 8, films A and B are exposed simultaneously upon the first exposure to light from the subject 12, the light being divided by light dividing means 10 so that the exposures on the films A and B are in reversed relation. In this form of my process the films A and B are both developed after the first exposure and prints A' and B' are made from them, the print A' being made in the usual manner as a positive print, the print B' being made on reversal stock, so that it is a negative the same as B.

The second exposure is made onto a film C through the print film B', made from the film B exposed on the first exposure. During the second exposure the film B' is a mat, the developed parts, that is the parts corresponding to those exposed upon the first exposure, operating to mat out those portions of the film C corresponding to the subject of the first exposure.

After the film C, which is to be the final negative film, has been exposed upon the second exposure through the mat film B', the image of the first exposure is printed onto it from the film A', the film A' being the positive print made from the original film A therefor making a negative image of the subject 12 of the first exposure on the film C in register with the parts matted out by the mat film B' during the second exposure.

The film C having been exposed directly during the second exposure through the mat film B' and having had the image of the first exposure printed onto it as a negative print from the positive print film A', is then developed producing the finished negative. With this manner of carrying out my process the images of the two exposures are obtainable in a single emulsion on the final film C and the several films used in the process are subject to corresponding amounts of treatment or development so that their shrinkage is the same.

Having described only a typical preferred form of my invention I do not wish to limit myself to the specific details set forth, but wish to reserve to myself any changes or variations that may appear to those skilled in the art or fall within the scope of the following claims:

Having described my invention, I claim:

1. A process of double exposure which includes making the first exposure of the object in a nonactinic field on two films, treating one of the films to render the exposed parts thereof opaque, making the second exposure on a third film through said treated film, and then uniting the other of said first two films and the third film with the images in registration to form a final composite film.

2. A process of double exposure which includes, making the first exposure of the object in a nonactinic field on two films, treating one to render the exposed parts thereof opaque, making the second exposure on a third film through the treated film, and then permanently uniting the other of said two films and said third film with the images superimposed.

3. A process of double exposure which includes, making the first exposure of the object in a nonactinic field on two films, treating one to render the exposed parts thereof opaque, making the second exposure on a third film through the treated film, permanently uniting said third film and the other of said two films with the images superimposed, and then developing the united films.

4. A process of double exposure which includes, making the first exposure of the object in a nonactinic field on two films, treating one to render the exposed parts thereof opaque, making the second exposure on a third film through the treated film, and then permanently uniting the other of said two films and said third film with the images superimposed and with their emulsion sides out.

5. A process of double exposure which includes, making the first exposure of the object in a nonactinic field onto two films directly onto the emulsion of one and through the body of the other, treating the first mentioned film to render its exposed parts opaque, making the second exposure through the treated film directly onto the emulsion of a third film, and then permanently uniting the said other film and said third film.

6. A process of double exposure which includes, making the first exposure of the object in a nonactinic field on two films, treating one to render the exposed parts thereof opaque, making the second exposure on a third film through the treated film, and then cementing together the other of said two films and said third film.

7. A process of double exposure which includes, making the first exposure of the object in a nonactinic field simultaneously on two films directly onto the emulsion of one and through the body of the other, treating the first mentioned film to render its exposed parts opaque, shrinking said other film to correspond to said treated film, making the second exposure onto a third film through the treated film with the emulsion sides of the films together, cementing the third film and said other film together with their emulsion sides out, and then developing the cemented films.

In witness that I claim the foregoing I have hereunto subscribed my name this 18th day of November, 1925.

FRIEND F. BAKER.